US 9,947,138 B2

United States Patent
Bare et al.

(10) Patent No.: US 9,947,138 B2
(45) Date of Patent: *Apr. 17, 2018

(54) SYSTEM AND METHOD FOR AUGMENTED REALITY DISPLAY OF DYNAMIC ENVIRONMENT INFORMATION

(71) Applicant: Huntington Ingalls, Inc., Newport News, VA (US)

(72) Inventors: Brian Bare, Newport News, VA (US); Jonathan Martin, Newport News, VA (US); Patrick Ryan, Newport News, VA (US); Paul Sells, Los Angeles, CA (US); Mark Lawrence, Newport News, VA (US); Justin Brooks, Newport News, VA (US); Joshua Mason, Newport News, VA (US)

(73) Assignee: Huntington Ingalls Incorporated, Newport News, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/686,427

(22) Filed: Apr. 14, 2015

(65) Prior Publication Data

US 2015/0294506 A1 Oct. 15, 2015

Related U.S. Application Data

(60) Provisional application No. 61/995,610, filed on Apr. 15, 2014, provisional application No. 61/984,159, (Continued)

(51) Int. Cl.
*G09G 5/00* (2006.01)
*G06T 19/00* (2011.01)
(Continued)

(52) U.S. Cl.
CPC ............ *G06T 19/006* (2013.01); *G08B 21/12* (2013.01); *H04W 4/02* (2013.01)

(58) Field of Classification Search
None
See application file for complete search history.

(56) References Cited

U.S. PATENT DOCUMENTS

| 4,863,268 A | 9/1989 | Clarke |
| 7,852,355 B2 | 12/2010 | Friedrich |
(Continued)

FOREIGN PATENT DOCUMENTS

| WO | WO 2013/023705 | 2/2013 |
| WO | WO 2013/049248 | 4/2013 |
| WO | WO 2014/015378 | 1/2014 |

OTHER PUBLICATIONS

PCT International Search Report, International Application No. PCT/US15/025784, dated Jul. 20, 2015, pp. 1-3.
(Continued)

*Primary Examiner* — M Good Johnson
(74) *Attorney, Agent, or Firm* — Hunton & Williams LLP

(57) ABSTRACT

A method for providing environment information to a mobile device user is presented. The method comprises receiving a request for target environment information from a mobile device, determining the pose of the mobile interface device relative to the target environment, and obtaining target environment data for one or more measurable environment parameters (e.g., radiation level). The target environment data is used to assemble augmented reality information configured for viewing in conjunction with a real-time view of the target environment captured by the mobile interface device. The target augmented reality information is then transmitted to the mobile device for display to the user.

19 Claims, 7 Drawing Sheets

Related U.S. Application Data filed on Apr. 25, 2014, provisional application No. 61/997,793, filed on Jun. 9, 2014, provisional application No. 62/025,041, filed on Jul. 16, 2014, provisional application No. 62/036,762, filed on Aug. 13, 2014.

(51) Int. Cl.
*H04W 4/02* (2018.01)
*G08B 21/12* (2006.01)

(56) References Cited

U.S. PATENT DOCUMENTS

| | | |
|---|---|---|
| 8,248,467 B1 | 8/2012 | Ganick et al. |
| 8,542,906 B1 | 9/2013 | Persson et al. |
| 9,170,766 B2 | 10/2015 | Meier |
| 2002/0075451 A1 | 6/2002 | Ruiz |
| 2002/0191004 A1* | 12/2002 | Ebersole ............ G09B 19/00 345/633 |
| 2003/0210228 A1* | 11/2003 | Ebersole ............ G02B 27/017 345/157 |
| 2007/0050115 A1 | 3/2007 | Discenzo et al. |
| 2007/0081695 A1 | 4/2007 | Foxlin |
| 2007/0088526 A1 | 4/2007 | Friedrich et al. |
| 2007/0136041 A1 | 6/2007 | Sheridan |
| 2009/0095086 A1 | 4/2009 | Kessler |
| 2009/0215471 A1 | 8/2009 | Sands |
| 2010/0190449 A1 | 7/2010 | Suzuki |
| 2010/0238161 A1* | 9/2010 | Varga ............ G06T 19/006 345/419 |
| 2010/0321389 A1 | 12/2010 | Gay |
| 2011/0066262 A1 | 3/2011 | Kelly |
| 2011/0115816 A1 | 5/2011 | Brackney |
| 2011/0121068 A1 | 5/2011 | Emanuel et al. |
| 2011/0164163 A1 | 7/2011 | Bilbrey |
| 2011/0187744 A1 | 8/2011 | Kim et al. |
| 2011/0216090 A1 | 9/2011 | Woo et al. |
| 2011/0306412 A1 | 12/2011 | Ehara et al. |
| 2012/0001938 A1 | 1/2012 | Sandberg |
| 2012/0015730 A1 | 1/2012 | Watkins |
| 2012/0098754 A1 | 4/2012 | Kim |
| 2012/0098859 A1 | 4/2012 | Lee et al. |
| 2012/0218263 A1* | 8/2012 | Meier ............ G06T 19/00 345/419 |
| 2013/0057581 A1 | 3/2013 | Meier |
| 2013/0113827 A1 | 5/2013 | Forutanpour et al. |
| 2013/0113993 A1 | 5/2013 | Dagit, III |
| 2013/0136300 A1 | 5/2013 | Wagner et al. |
| 2013/0154824 A1* | 6/2013 | Cai ............ G08B 21/02 340/539.11 |
| 2013/0162632 A1* | 6/2013 | Varga ............ G06T 19/006 345/419 |
| 2013/0222270 A1 | 8/2013 | Winkler |
| 2013/0231779 A1 | 9/2013 | Purkayastha et al. |
| 2013/0253824 A1 | 9/2013 | Yang |
| 2013/0257850 A1 | 10/2013 | Chen et al. |
| 2013/0321245 A1 | 12/2013 | Harper |
| 2013/0342568 A1* | 12/2013 | Ambrus ............ G09G 3/003 345/633 |
| 2014/0063055 A1* | 3/2014 | Osterhout ............ G06F 3/005 345/633 |
| 2014/0071163 A1 | 3/2014 | Kinnebrew et al. |
| 2014/0111544 A1 | 4/2014 | Hammond |
| 2014/0118397 A1 | 5/2014 | Lee et al. |
| 2014/0188333 A1 | 7/2014 | Friend |
| 2014/0267417 A1 | 9/2014 | Bare et al. |
| 2014/0280199 A1 | 9/2014 | Bare et al. |
| 2014/0282911 A1 | 9/2014 | Bare et al. |
| 2014/0375816 A1 | 12/2014 | Maihoefer |
| 2015/0029819 A1 | 1/2015 | Yacoubian |
| 2015/0042678 A1 | 2/2015 | Alt |
| 2015/0188984 A1 | 7/2015 | Mullins |
| 2015/0193982 A1 | 7/2015 | Mihelich |
| 2015/0283700 A1 | 10/2015 | Trautman |
| 2015/0310279 A1 | 10/2015 | Bare et al. |

OTHER PUBLICATIONS

International Search Report of the International Searching Authority issued in PCT/US2015/044838, dated Nov. 12, 2015 (2 pages).
Hammad, "Distributed Augmented Reality for Visualising Collaborative Construction Tasks", Journal of computing in civil engineering, No. 6, Oct. 15, 2009, pp. 171-183.
Chen et al., "A Smart Crane Operations Assistance System Using Augmented Reality Technology", Proceedings of 28 Internation Symposium on Automation and Robotics in Construction, 2011, pp. 643-649.
International Search Report of the International Searching Authority issued in PCT/US2015/040562, dated Oct. 15, 2015 (2 pages).
International Search Report of the International Searching Authority issued in PCT/US2015/033972, dated Aug. 21, 2015 (2 pages).
International Search Report of the International Searching Authority issued in PCT/US2015/025734, dated Jul. 30, 2015 (2 pages).
European Patent Office Communication, European Patent Application No. 15780277.8, pp. 1-8, dated Sep. 15, 2017.

* cited by examiner

SYSTEM AND METHOD FOR AUGMENTED REALITY DISPLAY OF DYNAMIC ENVIRONMENT INFORMATION

CROSS-REFERENCE TO RELATED APPLICATIONS

This application claims priority to U.S. Provisional Application Nos. 61/995,610, filed Apr. 15, 2014; 61/984,159, filed Apr. 25, 2014; 61/997,793, filed Jun. 9, 2014; 62/025,041, filed Jul. 16, 2014; and 62/036,762, filed Aug. 13, 2014, the complete disclosures of which are incorporated herein by reference in their entirety.

BACKGROUND OF THE INVENTION

This application relates generally to the use of augmented reality to display changes in dynamic environments and, more particularly, to the use of augmented reality to provide information and direction to users operating in or manipulating such dynamic environments.

Augmented reality (AR) provides a view of a physical, real-world environment whose elements are augmented (or supplemented) by computer-generated sensory input such as sound, text, graphics, or video. In a typical AR application, a data processor reviews a camera-captured image for cues that trigger the display of additional information and images along with a display of the captured image.

While AR is useful for conveying information via a static display, it is particularly useful in dynamic situations and environments where images are captured and displayed in real-time and the information to be displayed using AR (hereinafter, "AR information") changes. The ability to provide constant update to the AR information in response to changes in the environment and location and relative positioning of the user's display provides great utility in various applications including construction, repair, maintenance, and safety.

A particularly significant example of a dynamic spatial environment is the space on board a large ship. Not only does the ship itself move, its structure is flexible so that the position of a particular compartment or supporting structure in one part of the ship may change relative to other parts of the ship. Similar dynamic behavior can occur in tall buildings, construction sites, outdoor processing plants, roadways, bridges, etc.

In addition to changes in environmental structure, dynamic environments experience changes in an essentially infinite number of conditions. These can be as simple as changes in measurable atmospheric conditions (e.g., temperature and pressure) or as complex as changes in the surface topography of a metal sheet undergoing a welding operation.

For as many different possible conditions there are in a given environment, there are as many instances where rapid communication of changes in such conditions to individuals operating in or on that environment is essential.

SUMMARY OF THE INVENTION

An illustrative aspect of the invention provides a method for providing environment information to a mobile interface device user disposed in a dynamic structural environment. The method comprises receiving on a central data processor from the mobile interface device over a communication network a request for target environment information. The request includes information usable by the central data processor to determine the pose of the mobile interface device relative to a target environment that is a portion of the dynamic structural environment. The method further comprises determining the pose of the mobile interface device relative to the target environment. The method still further comprises obtaining target environment data for one or more measurable environment parameters and assembling AR environment information for transmission to and display on the mobile device. The AR environment information is assembled using the target environment data and is configured for viewing in conjunction with a real-time view of the target environment captured by the mobile interface device. The AR environment information is then transmitted to the mobile interface device.

Another illustrative aspect of the invention provides an automated system for providing environment information to a mobile interface device in a dynamic structural environment. The system comprises at least one mobile interface device configured for variable disposition within the dynamic structural environment, capturing information about a target environment within the structural environment, and transmitting the target area information over a network. A local positioning system is in communication with the at least one mobile interface device via the network. The local positioning system is configured to provide information usable to determine a mobile interface device pose comprising a position and orientation of the mobile interface device relative to the dynamic structural environment. The system also comprises a central processor comprising at least one data processing machine in communication with the at least one mobile interface device and the local positioning system via the network. The central processor is configured for receiving from a requesting one of the at least one mobile interface device a request for target environment information. The request includes information usable to determine the pose of the requesting mobile interface device relative to the target environment. The central processor is further configured for determining the pose of the requesting mobile interface device relative to the target environment, obtaining target environment data for one or more measurable environment parameters and assembling AR environment information for transmission to and display on the requesting mobile interface device. The AR environment information is assembled using the target environment data and is configured for viewing in conjunction with a real-time view of the target environment captured by the requesting mobile interface device. The central processor is also configured for transmitting the AR environment information to the mobile interface device.

Yet another illustrative aspect of the invention provides a method for providing radiation environment information to a mobile interface device user in a dynamic structural environment. The method comprises receiving on a central data processor from the mobile interface device over a communication network a request for target area radiation information. The request includes information usable by the central data processor to determine the pose of the mobile interface device relative to a target area in the dynamic structural environment. The method further comprise determining the pose of the mobile device relative to the target area, obtaining target area radiation information, and assembling augmented reality (AR) radiation environment information for transmission to and display on the mobile interface device. The AR radiation environment information is assembled using the target area radiation information and is configured for viewing in conjunction with a real-time view of the target area captured by the mobile interface device.

The AR radiation environment information is then transmitted to the mobile interface device.

BRIEF DESCRIPTION OF THE DRAWINGS

The invention can be more fully understood by reading the following detailed description together with the accompanying drawings, in which like reference indicators are used to designate like elements, and in which:

FIG. 7 is an illustration of an exemplary display of radiation environment information on a mobile interface device in accordance with an embodiment of the invention; and.

DETAILED DESCRIPTION OF THE INVENTION

The present invention provides methods and systems for real-time display of AR information on a mobile device immersed in and movable within a dynamic environment. The challenges presented by this scenario include determination of the location of and orientation of the mobile device within the environment, recognition of variations in the spatial geometry of the environment, and detection/identification of changes in other measurable parameters associated with the environment or objects within the environment.

While the invention will be described in connection with particular embodiments, it will be understood that the invention is not limited to these embodiments. On the contrary, it is contemplated that various alternatives, modifications and equivalents are included within the spirit and scope of the invention as described.

While the dynamic structural environments used in many of the examples and illustrative embodiments used herein to describe the invention relate to ships and other vessels, it will be understood that the invention is not limited to such environments. The invention can be used in, without limitation, land vehicles, buildings and any other static or dynamically variable structure.

The systems of the invention use AR as the primary medium for presenting environment-related information to a user. AR allows presentation of such information on the mobile interface device in graphical or textual form overlaid or adjacent an environmental area or object as it appears in the camera-generated view on the device screen.

Figure 1:
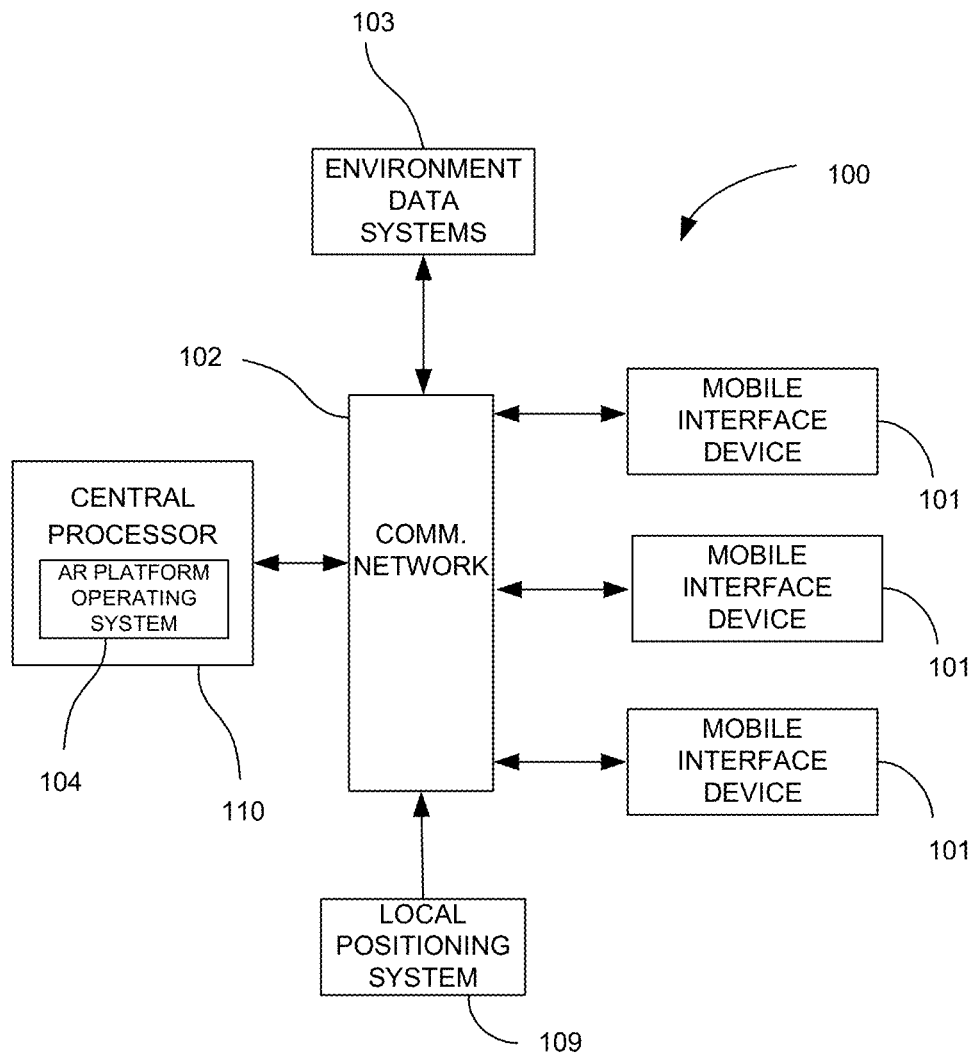
FIG. 1 is a schematic representation of a system for providing environment information to a mobile interface device according to an embodiment of the invention.

A generalized system 100 for generating and displaying real-time AR information according to an embodiment of the invention is illustrated in FIG. 1. The system 100 is configured for obtaining and storing information on a dynamic structural environment such as a ship or building and objects disposed within that environment. The system 100 comprises a central processor 110 in communication with one or more mobile interface devices 101 via a communication network 102. The central processor may include or be in communication with a relational database structure (not shown) as is described in U.S. patent application Ser. No. 14/210,650 (the "'650 application), filed on Mar. 14, 2014, the complete disclosure of which is incorporated herein by reference in its entirety. In general, the central processor 110 is configured to receive captured object information from the mobile interface devices 101 and to extract information relating to the environment or an object in the environment, generate AR information for display on a requesting mobile interface device, and transmit the AR information to the requesting mobile interface device 101.

The central processor 110 may include or be configured to receive information from a local positioning system 109 via the communications network 102 or a different network. The central processor may be configured to use the information from the local positioning system 109 in conjunction with information from a requesting mobile interface device 101 and known/stored structural information (e.g., a three dimensional model) to determine the pose of the mobile interface device 101 within the environment. As used herein, "pose" means the position (x,y,z) and orientation ($\theta,\varphi,\zeta$) of an object in a particular physical space. The system is configured to resolve spatial differences between the coordinate system established based on the known structural information and the data received from the local positioning system 109 that result from changes in the dynamic structure.

The central processor 110 is also configured to receive information from one or more environment data systems 103 via the network 102 or another network. The environment data system 103 is configured for measurement or determination of parameters associated with the structural environment or an object or objects within the structural environment. As will be discussed in more detail, such parameters may include, but are not limited to spatially mapped or mappable data obtained from sensors (e.g., radiation or temperature sensors) with known locations in the structural environment, spatially mapped or mappable data (e.g., weight distribution or surface topography) associated with a particular object in the environment, and system or device status information (e.g., electrical circuit energization status). The central processor 110 is configured to process this information and use it with the pose information for the requesting mobile interface device 101 to generate AR information that can be transmitted to the mobile interface device 101 for display.

In various embodiments of the invention, information processed by the central processor 110 may include asset location information from a global or local positioning system, visual or graphical information received from the mobile interface devices, observational information from users, and operational or other data from instrumentation systems associated with the environment or particular assets. Any or all of such information can be used by the central processor 110 to update object-related information and/or generate information for display via AR images that can be superimposed on the mobile device user's view of the environment or an object in the environment. The mobile interface devices used in the systems of the invention can make use of AR in a variety of ways that allow the user to conduct inspection, maintenance, repair, and replacement tasks in relation to particular assets. AR can also be used to assist a user in identifying safety hazards, locating objects, or simply navigating within the dynamic environment.

The mobile interface device 101 may be any mobile computing solution that is used by a user to facilitate communication with and display information from the central processor 110. The mobile interface device 101 may be, for example, a tablet computer, a smartphone, or a wearable heads-up display. The mobile interface device 101 may have features including, but not limited to a processor, a display (such as a screen), a vision sensor (such as a camera), a microphone, one or more speakers, and wireless communications capabilities. The mobile interface device 101 may be, in a particular embodiment, a wearable head-mounted device (HMD) such as that described in U.S. application Ser. No. 14/210,730, filed Mar. 14, 2014, the complete disclosure of which is incorporated herein by reference in its entirety. In preferred embodiments, the mobile interface device 101 is equipped or configured to display AR images/information to a user. The mobile interface device 101 may include one or more accelerometers or other motion detection sensors. Each mobile interface device 101 may include one or more unique identifiers. In some embodiments, some or all of the mobile interface devices 101 may include one or more local positioning receivers, image and object recognition, audio queues, or electromagnetic field (EMF) receivers or detectors (for GPS, WiFi, or RFID reception or light detection).

The communication network 102 may be a wireless network, a wired network or any combination of wireless network and wired network. In a preferred embodiment, the communications network 102 is a wireless communications network, allowing the mobile interface devices 101 to communicate wirelessly with the central processor 110. The communication network 102 may, in particular, be or include a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal.

The central processor 110 may be or comprise one or more servers, data processing machines, or network-enabled computers and may host an AR operating system 104. The AR operating system 104 may be configured to control the interaction of the hardware and software components of a relational database structure (not shown). The relational database structure is configured to provide a logical framework that allows digital information to be associated with physical objects. This framework includes addresses for both tangible objects as well as individual point addresses within a coordinate system for the structural environment. In an exemplary embodiment, this coordinate system is based on a three dimensional (3D) structural model of the environment (e.g., the ship or building). Preferably, the 3D model provides a complete detail of the environment including every space, room or compartment where objects may be disposed.

The AR operating system 104 is configured to assemble AR information for transmission to and display by the mobile device 101. The AR information is constructed using the processed environment data from the environment data systems 103 and the pose of the mobile device 101 using any of various techniques known in the art. The AR information may be presented for display as text or as graphical images that can be superimposed over real-time images captured by the mobile device 101. The AR information may be associated with specific parameters relating to the portion of the environment where the mobile device 101 is located or relating to an object or system near the mobile device 101 and/or with which the user of the mobile device 101 is interacting.

The central processor 110 may be configured or may comprise a processor or processing module and computer executable software (e.g., on a tangible computer-readable medium) configured to perform various processing functions relating to object recognition, including feature extraction to extract lines, edges, ridges, or other localized interest points from an image; detection or segmentation to select a specific set of interest points within an image or segment multiple image regions that contain a specific object of interest; image recognition to categorize a detected object into a particular category; noise reduction; contrast enhancement; and/or space scaling, for example.

The relational database structure may include a domain coordinate management system that maintains spatial addresses for all spaces within the domain of the structural environment. The domain coordinate management system may be configured to receive spatial address information from both the local positioning system 109 and from the three dimensional structural model. The domain coordinate management system is configured to resolve spatial differences between the coordinate system established by the 3D model of the structure and any available telemetry data received from the local positioning system 109 as a result of changes in the dynamic structure. Such differences may be particularly significant in, for example, a large vessel underway at sea. Ships (particularly large ships) are not rigid bodies.

The local positioning system 109 is a system (complete or composite) that facilitates the establishment or estimation of the pose of a mobile interface device 101 within the coordinate system described or approximated by the three dimensional model of the structural environment. As is discussed in more detail in U.S. application Ser. No. 14/210, 601, filed Mar. 14, 2014 (the "'601 application"), the complete disclosure of which is incorporated herein by reference in its entirety, pose may be accurately established using vision science-based algorithms. Such algorithms may recognize one or more unique pre-identified visual tracking cues within a physical space.

The local positioning system 109 may be or include any system capable of establishing the position and/or orientation of a mobile interface device relative to a structural environment coordinate system. This coordinate system may be, or may be based on, for example, a predetermined reference system for a ship or other structure. In some embodiments, the local positioning system 109 may comprise a light positioning system that operates by using light points positioned throughout the physical spaces of the vessel. An example of a light positioning system is described in U.S. Pat. No. 8,248,467, the complete disclosure of which is incorporated herein by reference in its entirety. In some embodiments, the local positioning system 109 may use electromagnetic or sound waves emanating from various points within the physical spaces in the structural environment. Examples of electromagnetic or sound waves include radio frequency identification (RFID) signals, radio signals, WiFi signals, audio tones, and/or sound waves. The local positioning system 109 may use unique images or recognizable visual features, quick response (QR) codes, bar codes, or reference points placed throughout the physical space of the structure.

The system 100 may use information from more than one local positioning system. Alternatively or in addition, the system 100 may receive and use information from a global positioning system (GPS) (not shown).

It will be understood that various processing components of the system 100 may be combined into a single processor or further subdivided into multiple processors or servers. It will be appreciated that in some cases, multiple instances of a particular component of the system 100 may be used. Moreover, the system 100 may include other devices not depicted in FIG. 1.

Figure 2:
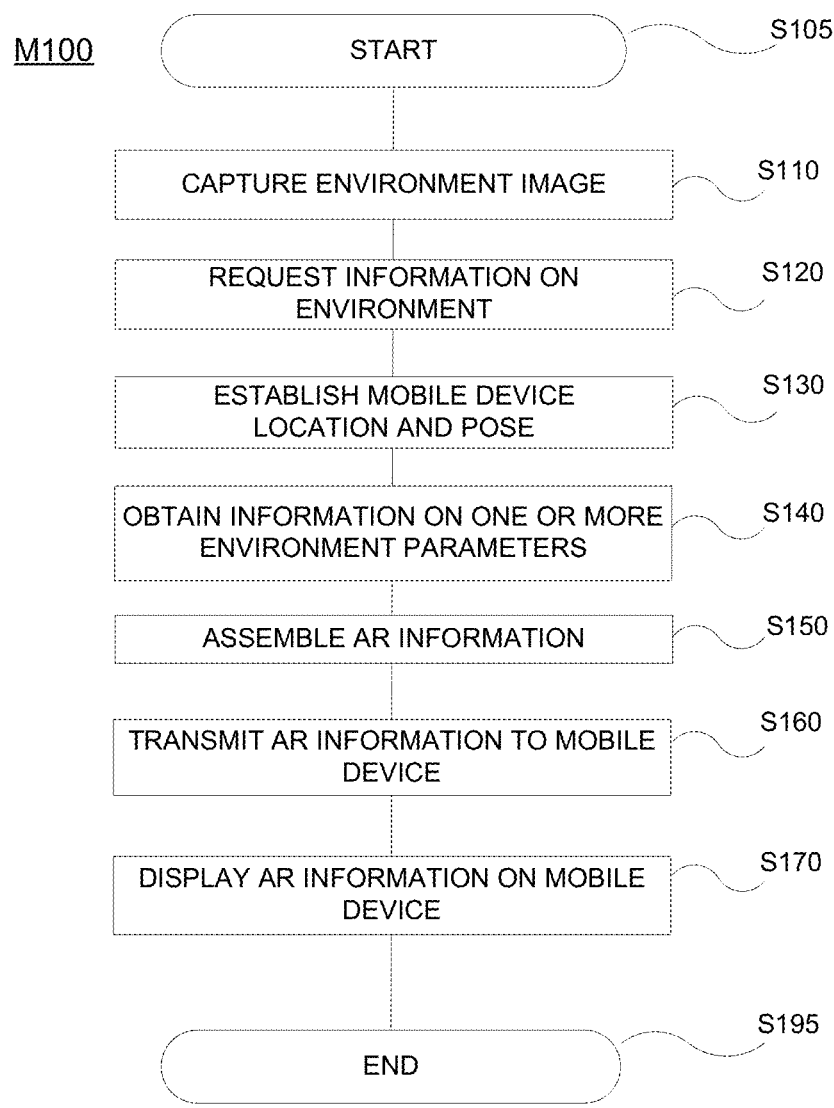
FIG. 2 is a flow diagram of a method of providing environment information to a mobile interface device in a dynamic structural environment according to an embodiment of the invention.

The system 100 can be used to provide mobile device users with real-time AR information on changing environmental parameters or object characteristics. With reference to FIG. 2, a generalized method M100 for providing such AR information to a mobile device user begins at S105. At S110, the user uses the mobile interface device 101 to capture a digital image of a target environment, which may be a portion of the environment in which the user is disposed and/or a target object in that environment. At S120, a request for target environment information is sent from the mobile interface device to a central processor 110 over a network 102. The request includes information usable by the central processor to determine the exact location and pose of the mobile interface device 101 relative to the target environment. This information may include some or all of the digital image. At S130, the central processor 110 uses the request information along with information from the local positioning system 109 to establish the exact location and pose of the mobile device 101 relative to the target environment.

At S140, the central processor 110 obtains environment information on one or more environment or target object-related parameters from one or more environment data systems 103. Such information may be raw data from sensors located in areas near the mobile interface device 101 or on or associated with the target object. The information may also be or include information on the status of a system with which the mobile device user may be required to interact. It will be understood that the information from the environment data systems 103 may be provided to the central processor 110 on a constant basis or may instead be provided in response to a request or query submitted by the central processor 110. At S150, the central processor 110 uses the environment information to assemble AR information for transmission to the mobile interface device 101. This action may include processing of raw data from the environment data systems into a form usable by the AR operating system 104 to construct the AR information. In some embodiments, the AR information includes a graphical representation of target environment parameters as a visual display that can be superimposed over a real-time view of the target environment captured by the mobile interface device 101. At S160, the central processor 110 transmits the AR information to the mobile interface device 101 where it is displayed to the mobile device user at S170. The method ends at S195.

As previously discussed, the AR information may be presented as text displayable in conjunction with the visual display of the environment or target object or as graphical imagery that can be superimposed over an appropriate portion of the visual display. The graphical imagery could, for example, be or include one or more graphical representations of the parameters measured by the environmental data systems or of a condition of the environment associated with such parameters.

It will be understood that, once requested, some or all of the actions of the method M100 may be repeated to periodically or continuously provide real-time environment information to the mobile interface device 101. This assures that the user is aware of variations due to changes in conditions including but not limited to: the user's location, the overall structural environment, the measured environment parameters, or combinations of the foregoing.

The methods of the invention are usable by individuals conducting virtually any operation within a dynamic environment. Of particular interest are uses in which real-time display of immediately recognizable cues increase the safety of a user in a potentially dangerous environment.

One particularly dangerous operational environment is a workplace where radiation may be encountered. Obviously, it is a major safety concern for individuals occupationally exposed to radionuclides that the extent of their radiation exposure be carefully monitored by measuring and calculating the amount of radiation absorbed. The process of determining radiation exposure of a person or thing is generally done through radiation dosimetry and radiological assessments. David C. Kocher points out in his "Radioactive Decay Tables" Report DOE/TIC-1 1026, Oak Ridge National Laboratory (1981), that estimating radiation dose to man from exposure to radionuclides requires a knowledge of the energies and intensities of the radiations emitted during the radioactive decay process. Measurement of this radiation is generally done by using a dosimeter, either portable or fixed in a working area, or worn by personnel occupationally exposed to radionuclides.

The above approach, however, is an after-the-fact measure. What is needed is a straightforward way of avoiding exposure. This presents a significant difficulty, however, since radiation is an invisible hazard. Heretofore, there has been no method by which an individual in proximity to a radiation source or an irradiated space can visualize the extent or intensity of the radiation field.

This problem has been solved by a particular implementation of the systems and methods of the present invention. In this implementation, radiation measurements can be used to construct a real-time representation of a radiation field that can be displayed as an AR image on a user's mobile interface device. The implementation may be referred to as an AR radiation viewer system or ARRView for short. ARRView improves upon current methods by providing a visually augmented display of the detected or calculated extent, intensity, and movement of radiation emissions in observed spaces, thus increasing the user's situational awareness of high and low exposure areas. This could be the difference between the user maintaining a safe minimum exposure position or being exposed to a dose of radiation that impacts their ability to continue to safely work in the area.

It will be understood by those of skill in the art that while ARRView has particular value on nuclear-powered vessels and ships, it is usable in any environment where radiation may be encountered, including nuclear power plants. It should also be noted that a variation of the ARRView system could also be used to provide visual representations of other invisible hazards. Any invisible gas, such as Argon, Carbon Monoxide, or other hazardous gases, can be displayed along with such parameters as oxygen levels, temperature levels, or other hazardous conditions. It can also display hazards due to changes in gas or atmospheric properties by providing an augmented representation of the detected or calculated extent, intensity, and movement of such properties.

Figure 3:
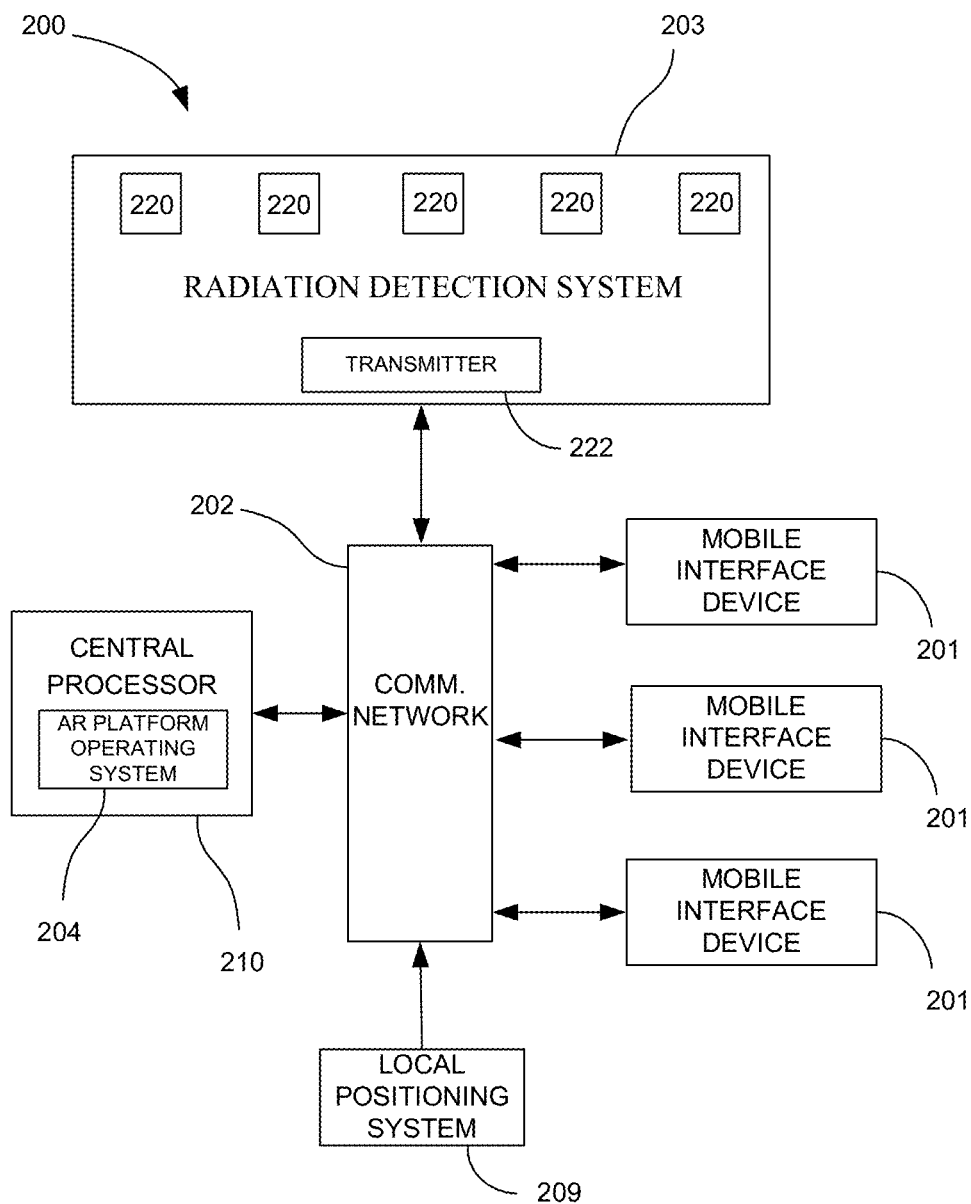
FIG. 3 is a schematic representation of a system for providing radiation environment information to a mobile interface device according to an embodiment of the invention.

FIG. 3, illustrates a radiation detection and display system 200 according to an embodiment of the invention that can be used to implement the ARRView concept. The system 200 is essentially a specific variation of the generalized AR environment display system 100 of FIG. 1. It is noted that system 200 illustrates only a single instance of each component. It will be appreciated that multiple instances of these components may be used and that the system 200 may include other devices not shown in FIG. 3. It will be understood that in many environments, the system 200 will interface with other systems such as, for example, the operating system of a shipboard operations and maintenance platform as described in the '650 application.

The system 200 comprises a central processor 210 in communication with one or more mobile interface devices 201 via a communication network 202. The mobile interface device 201 may be any mobile computing solution that is integratable into the ARRView system. The mobile interface device 201 may be, for example, a tablet computer, a smartphone, or a wearable heads-up display. The central processor 210 may include or be in communication with a relational database structure (not shown) as described in the "'650 application. The central processor 210 may be configured to receive information from a local positioning system 209 via the communications network 202 or via a different network.

The central processor 210 is also configured to receive radiation information via the network 202 (or another network) from one or more radiation detection systems 203. Each radiation detection system 203 may comprise one or more radiation sensors 220 capable of detecting and measuring gamma or other radiation intensity discretely or continuously. In particular embodiments, sensors 220 configured to detect the presence and magnitude (quantity) of gamma radiation photons may be used, including any suitable form of Geiger counter, Gamma Probe, or Scintillation detector based on gamma spectroscopy. Gamma sensors can provide a real-time reading, or prior reading, of detected gamma radiation in a given irradiated space.

The radiation detection system 203 may take radiation readings automatically at regular intervals or manually upon command. The systems 203 may include a data processing machine (not shown) for processing the sensor data prior to transmission to the central processor 210 or may provide unprocessed data. In each case, sensor data is associated with the location of the sensor 220 within the environment to allow the system 200 to establish the radiation environment relative to the location of any particular mobile interface device 201. The radiation detection system 203 may be configured with a transmitter 222 to transmit radiation information to the central processor 210 over the communications network 202. In some embodiments, each sensor 220 of the radiation detection system 203 may be provided with a transmitter to transmit data to the detection system processor or directly to the central data processor 210.

Figure 4:
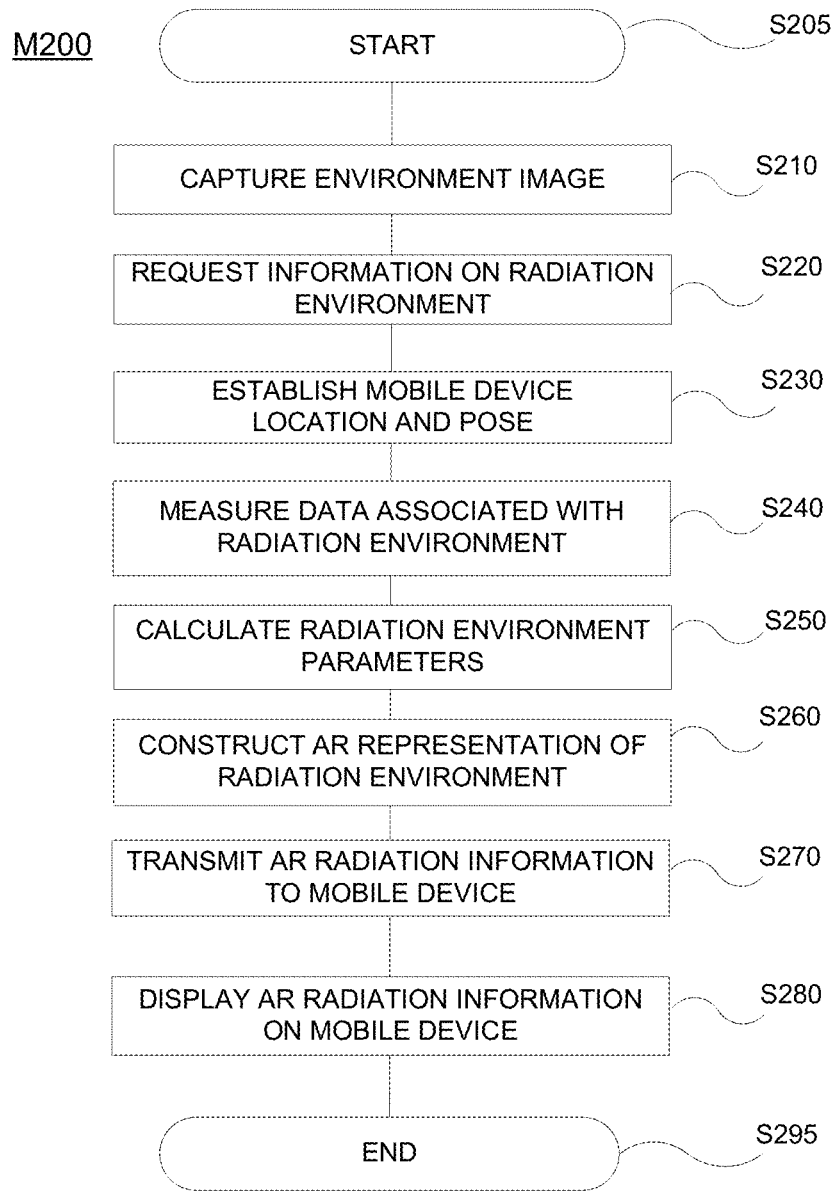
FIG. 4 is a flow diagram of a method of providing radiation environment information to a mobile interface device in a dynamic structural environment according to an embodiment of the invention.
Figure 5:
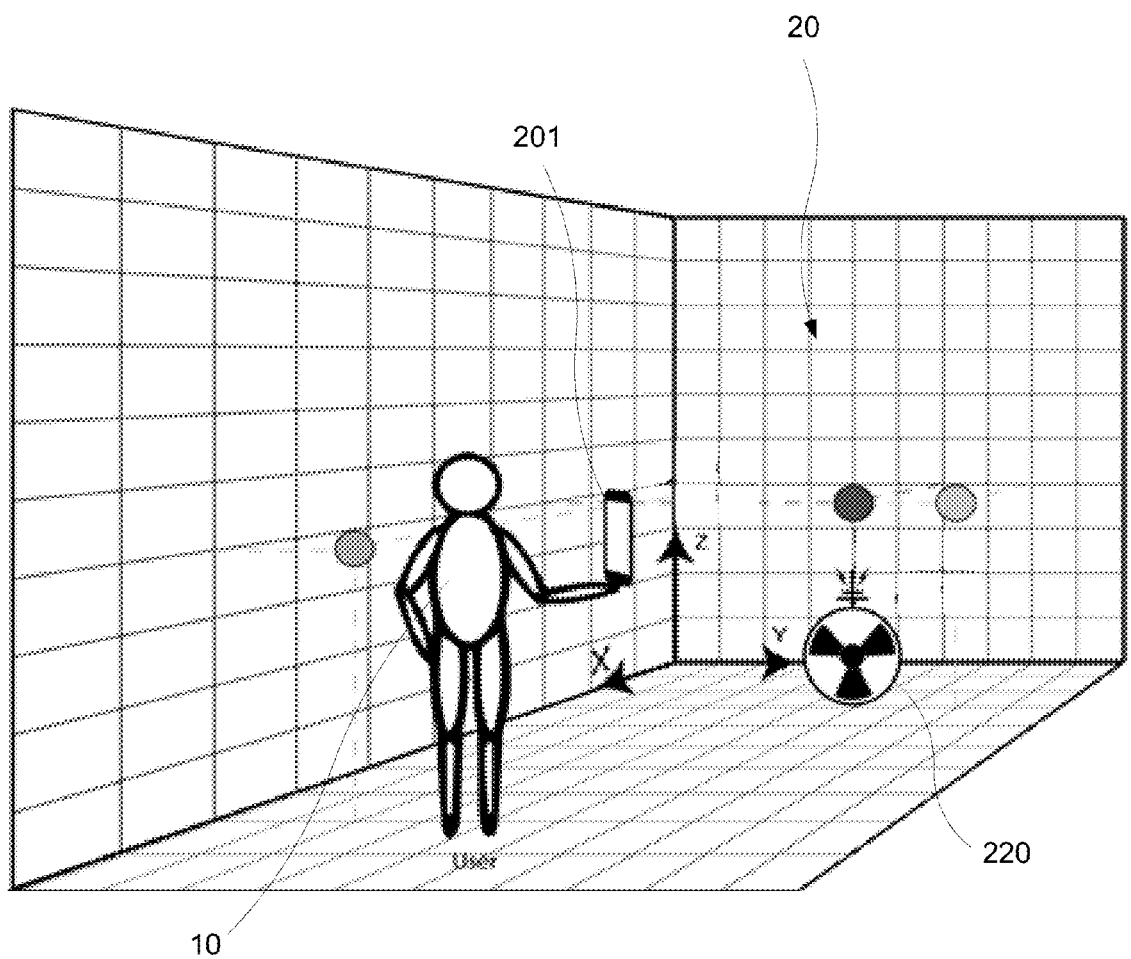
FIG. 5 is an illustration of a mobile interface device user in an area having a radiation sensor for detection of a radiation level in the area.

With reference to FIGS. 4 and 5, a method M200 uses the radiation detection and display system 200 to provide radiation environment information to a mobile device user 10. The method begins at S205. At S210, the user uses the mobile interface device 201 to capture a digital image of a portion 20 of the environment where there is a potential for radiation (referred to herein as the target environment or target area). At S220, a request for radiation environment information is sent from the mobile interface device 201 to a central processor 210 over a network 202. The request includes information usable by the central processor 210 to determine the exact location and pose of the mobile interface device 201 with respect to the local environment space and/or the target area. The space could be, for example, a room or other space inside a vessel or building. The information sent from the mobile interface device 201 may include some or all of the captured digital image. At S230, the central processor 210 uses the request information along with information from the local positioning system 209 to establish the exact location and pose of the mobile interface device 201 relative to the target area 20.

At S240, data associated with the radiation environment in the target area 20 is obtained using the radiation sensors 220. Data readings may be taken during or prior to the target area visualization process. The intensity (measured in, for example, roentgen equivalent in man (REMs) and/or Sieverts, etc.) and spatial location within the established coordinate system obtained. This may be accomplished dynamically via a remotely-connected sensor (using telemetry) or statically using recent survey data taken by a human surveyor or remote sensor. At S250, the radiation sensor data and spatial information may be used as inputs to a computational component or simulation engine that will output the results of the calculations performed. The simulation engine may use simulation-based computational engineering and visualization software. This class of software specializes in applied solutions of the Boltzmann Transport Equation (although other equations may be used). While this software is typically used in the engineering and design process to estimate gamma radiation propagation and design shielding installations, in the present context, it can be used to extrapolate from point radiation measurements to provide a three dimensional estimate of the radiation environment in a particular space. If computation is not necessary (e.g., when discrete radiation readings are displayed directly), S250 is not required.

It will be understood that the action of calculating radiation environment parameters may be conducted by a processor of the radiation detection system 203 or the central processor 210 or may be conducted in part by a processor of the radiation detection system 203 and in part by the central processor 210.

In preferred embodiments, the data used to estimate the radiation environment is available in real time so that the actual live levels can be provided to the mobile device user 10. In some instances, however, such live readings may be unavailable. In such instances, the radiation environment may be estimated based on previous recorded readings in or around the target area. Alternatively, a stochastic estimation may be made of the dispersion patterns of radiation given known or estimated values and known geometries and conditions. Such estimations are frequently used in pre-planning of work evolutions throughout the nuclear industry.

Figure 6:
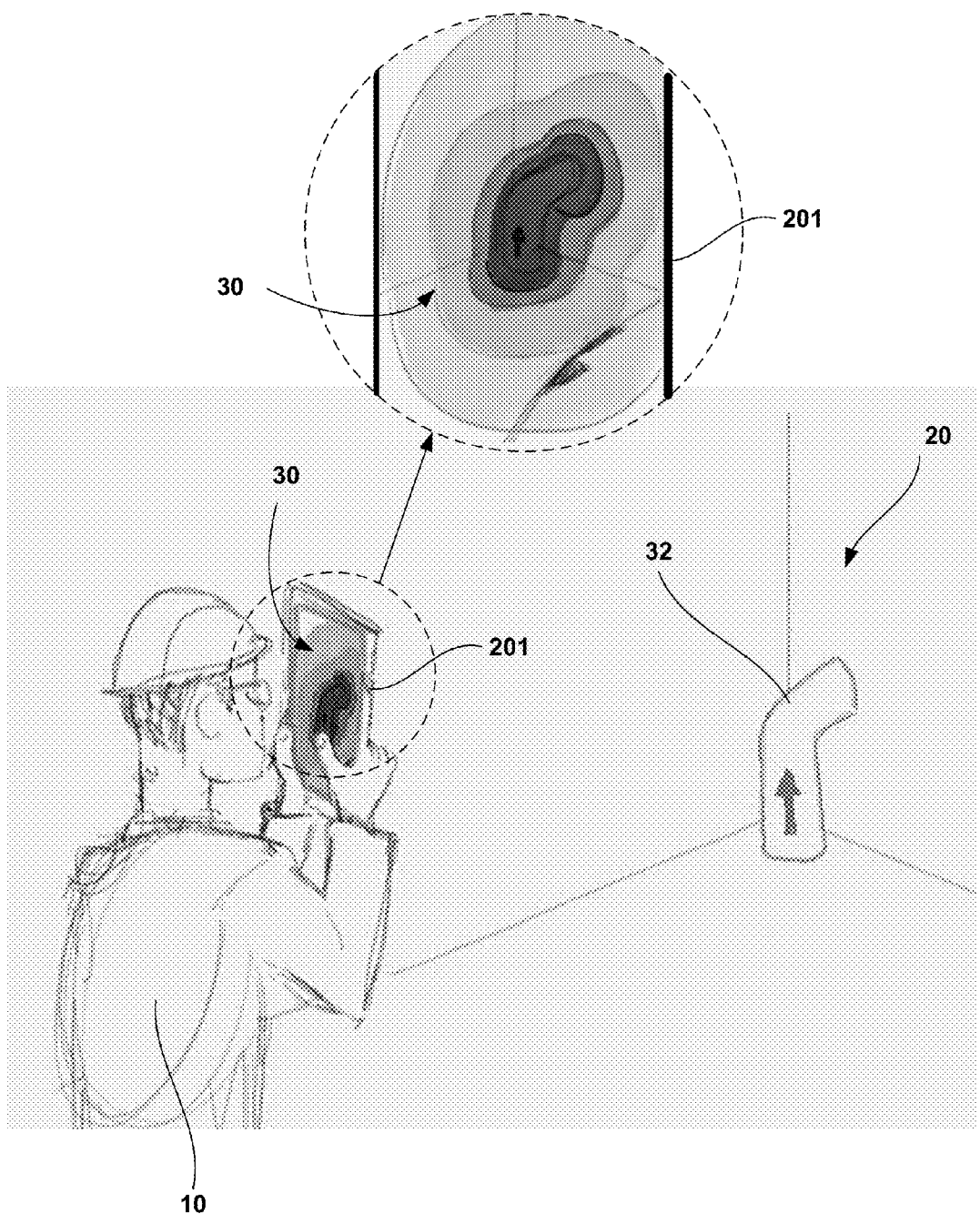
FIG. 6 is an illustration of a mobile device user and a mobile device having exemplary AR radiation information displayed thereon in accordance with an embodiment of the invention.
Figure 7:
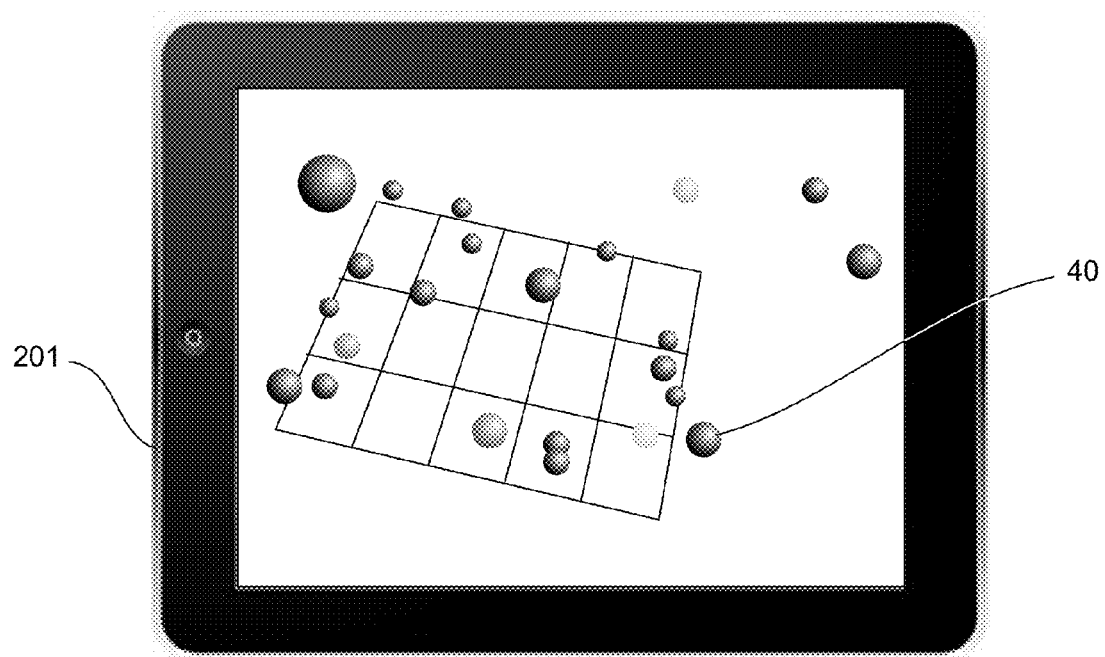
Figure 8:
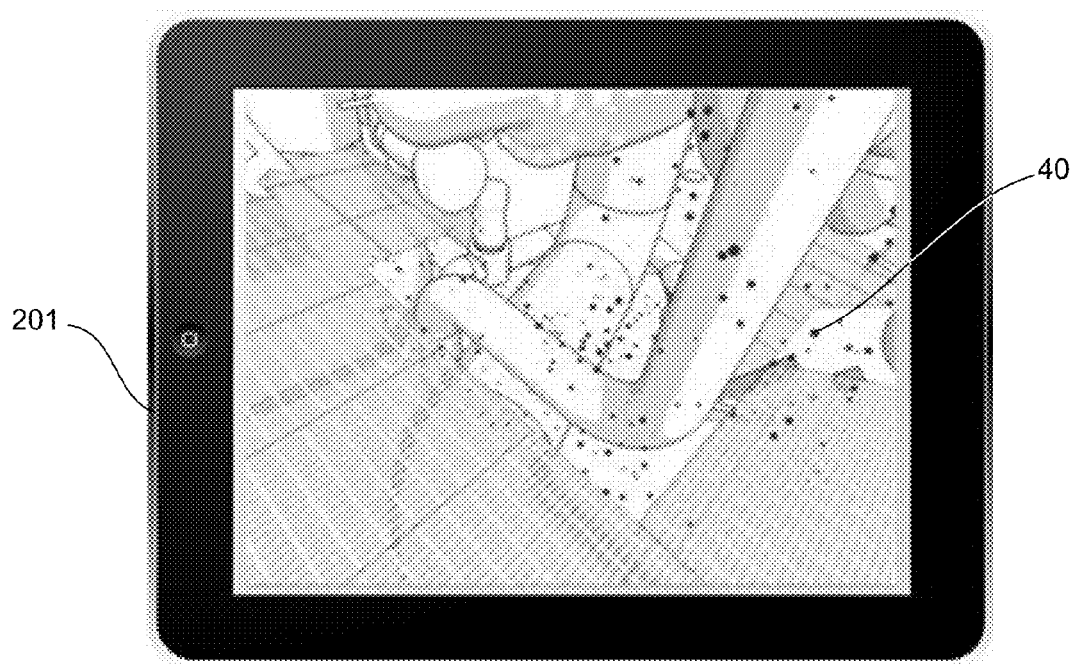
FIG. 8 is an illustration of an exemplary display of radiation environment information on a mobile interface device in accordance with an embodiment of the invention.

At S260 a rendering engine on the central processor 210 uses data received (discretely or continuously) from the simulation engine or directly from the radiation sensors 220 along with mobile device pose information to construct an AR representation of the radiation environment for the target area 20. In preferred embodiments, this includes graphically rendering a visual display that can be superimposed over the view of the target area 20 captured by the mobile interface device 201. This rendering could include, for example, a depiction 30 of an emission cloud from a known point source 32 (see FIG. 6), a surface density diagram, topographical maps showing peaks and valleys to indicate hot spots and low level radiation, multiple spheres or other geometric figures 40 of varying in size and color to indicate intensity and spatial extent of the radiation (see, e.g, FIGS. 7 and 8) or other notional user view of radiation visualization. The user of mobile interface devices 201 may visualize an augmented representation of the radiation in its proper location on the device. At S270, AR radiation information, which is or includes the AR representation of the radiation environment constructed in S260, is transmitted to the mobile interface device 201. At S280, some or all of the AR radiation information is displayed on the mobile interface device 201. In preferred embodiments, the graphical AR rendering of the radiation environment is superimposed over the displayed image of the target area 20 so that the user is able to see the relative intensity of the radiation throughout the target area 20.

It will be understood that, once requested, some or all of the actions of the method M200 may be repeated to periodically or continuously provide real-time environment information to the mobile interface device 201. This assures that the user is aware of variations in the radiation environment due to changes in conditions including but not limited to: the user's location, the overall structural environment, the measured radiation environment parameters, or combinations of the foregoing.

The present invention is intended to make the presence of invisible radiation not only perceivable to human operators, but properly displayed relative to its spatial location and distribution. There are no known prior art methods that provide workers with this kind of real-time situational awareness of both the sources and dispersion patterns of radiation when entering or working in an irradiated space or in proximity to a radiation source.

It will be understood that while the hazardous environment systems and methods of the present invention have been described in terms of radiation detection and visualization, they are equally applicable to other ordinarily invisible environmental hazards. By replacing the radiation sensors with other sensors as appropriate (e.g., detectors for harmful gases such as carbon monoxide and others, surface temperature sensors, etc.), the system can be used to construct AR representations or textual warnings for virtually any invisible hazardous environment.

It will also be understood that the generalized systems and methods disclosed herein are usable in a wide variety of non-hazardous operational environments in which a user conduct operations that alter the environment or a target object within the environment over time. Accordingly, the present invention is widely usable in virtually any maintenance or construction environment.

As has been discussed, while the systems and methods of the present invention have a particular value when applied to vessels and other mobile structures, they may also be applied to stationary buildings and other structures as well. In stationary environments, GPS and GIS information are typically available and may be used by the operating system. The invention is, however, of particular utility in shipboard or other mobile/dynamic environments in which GPS information may be unreliable or unavailable. As has also been discussed, the present invention also addresses the problem of dynamic changes in structure and relative positioning such as are often encountered in large vessels. It will be understood that in some embodiments, the invention may be usable in a setting in which the user is not inside a structure and that the term "structural environment" may encompass exterior structural settings.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for providing environment information to a mobile interface device user in a dynamic structural environment in the form of a dynamic structure having an associated environment coordinate system, the method comprising:
receiving on a central data processor from the mobile interface device over a communication network a request for target environment information, the request including request information usable by the central data processor to determine the pose of the mobile interface device relative to a target environment that is a portion of the dynamic structural environment;
receiving mobile interface device location information from a local positioning system of the dynamic structure, said location information being provided using the environment coordinate system;
determining the pose of the mobile interface device relative to the target environment using the request information and the mobile interface device location information;
obtaining target environment data for one or more measurable environment parameters;
assembling augmented reality (AR) environment information for transmission to and display on the mobile interface device, the AR environment information being assembled using the target environment data and being configured for viewing in conjunction with a real-time view of the target environment captured by the mobile interface device; and
transmitting the AR environment information to the mobile interface device,
wherein the action of determining the pose of the mobile interface device accounts for spatial changes in the environment coordinate system in the target environment due to changes in the dynamic structural environment.

2. A method according to claim 1, wherein the mobile interface device is one of the set consisting of a tablet computer, a smartphone, and a wearable heads-up display.

3. A method according to claim 1 wherein the request for target environment information includes a digital image of the target area captured by the mobile interface device.

4. A method according to claim 1 wherein the action of obtaining target environment data includes:
receiving environment parameter data from one or more sensors located in or adjacent the target environment.

5. A method according to claim 4 wherein the AR environment information includes a graphical representation of at least one of the one or more measurable environment parameters, the graphical representation having been constructed using the target environment data.

6. A method according to claim 1 wherein the target environment data comprises radiation sensor data from at least one location in or adjacent the target environment.

7. A method according to claim 6 further comprising:
constructing a three dimensional estimate of radiation levels in the target environment.

8. A method according to claim 7 wherein the AR environment information includes a graphical representation of the three dimensional estimate of radiation levels in the target environment that can be superimposed over the real-time view of the target environment captured by the mobile interface device.

9. A method according to claim 1 wherein the actions of determining, obtaining, assembling and transmitting are periodically repeated.

10. An automated system for providing environment information to a mobile interface device in a dynamic structural environment in the form of a dynamic structure having an environment coordinate system, the system comprising:
 at least one mobile interface device configured for variable disposition within the dynamic structural environment, capturing information about a target environment within the structural environment, and transmitting the target area information over a network;
 a domain coordinate management system comprising one or more data processors configured for receiving information on a current conformation of the dynamic structural environment and resolving spatial differences in the environment coordinate system between the current conformation of the dynamic structural environment and a stored model of the dynamic structural environment;
 a local positioning system disposed at least partially within the dynamic structure, the local positioning system being in communication with the at least one mobile interface device and the domain coordinate system via the network and being configured to provide location information usable to determine a mobile interface device pose, said mobile interface device pose comprising a position and orientation of the mobile interface device relative to the target environment in the environment coordinate system; and
 a central processor comprising at least one data processing machine in communication with the at least one mobile interface device, the domain coordinate management system, and the local positioning system via the network, the central processor being configured for
  receiving from a requesting one of the at least one mobile interface device a request for target environment information, the request including information usable to determine the pose of the requesting mobile interface device relative to the target environment,
  determining the pose of the requesting mobile interface device relative to the target environment, accounting for spatial changes in the environment coordinate system in the target area due to changes in the dynamic structural environment,
  obtaining target environment data for one or more measurable environment parameters,
  assembling augmented reality (AR) environment information for transmission to and display on the requesting mobile interface device, the AR environment information being assembled using the target environment data and being configured for viewing in conjunction with a real-time view of the target environment captured by the requesting mobile interface device, and
  transmitting the AR environment information to the requesting mobile interface device.

11. A system according to claim 10 further comprising:
 at least one environment data system comprising one or more sensors located in or adjacent the target environment, the one or more sensors being configured for capturing the target environment data.

12. A system according to claim 11 wherein the one or more sensors are radiation sensors and the target environment data comprises a radiation level from at least one location in or adjacent the target environment.

13. A system according to claim 10 wherein the domain coordinate management system comprises one or more computers in communication with the central processor and the local positioning system and is being configured for
 establishing and maintaining spatial addresses for spaces and points within the dynamic structural environment, and
 receiving spatial address information from both the local positioning system and from the stored model of the dynamic structural environment.

14. A method for providing radiation environment information to a mobile interface device user in a dynamic structural environment in the form of a dynamic structure having an associated environment coordinate system, the method comprising:
 receiving on a central data processor from the mobile interface device over a communication network a request for target area radiation information, the request including request information usable by the central data processor to determine a pose of the mobile interface device relative to a target area in the dynamic structural environment;
 receiving mobile interface device location information from a local positioning system of the dynamic structure, said location information being provided using the environment coordinate system;
 determining the pose of the mobile interface device relative to the target area using the request information and the mobile interface device location information;
 obtaining target area radiation information;
 assembling augmented reality (AR) radiation environment information for transmission to and display on the mobile interface device, the AR radiation environment information being assembled using the target area radiation information and being configured for viewing in conjunction with a real-time view of the target area captured by the mobile interface device; and
 transmitting the AR radiation environment information to the mobile interface device,
 wherein the action of determining the pose of the mobile interface device accounts for spatial changes in the environment coordinate system in the target area due to changes in the dynamic structural environment.

15. A method according to claim 14, wherein the mobile interface device is one of the set consisting of a tablet computer, a smartphone, and a wearable heads-up display.

16. A method according to claim 14 wherein the request for target environment information includes a digital image of the target area captured by the mobile interface device.

17. A method according to claim 14 wherein the action of obtaining radiation data includes:
 receiving radiation data from one or more radiation sensors located in or adjacent the target environment.

18. A method according to claim 17 further comprising:
 constructing a three dimensional estimate of radiation levels in the target area.

19. A method according to claim 18 wherein the AR radiation environment information includes a graphical representation of the three dimensional estimate of radiation levels in the target area that can be superimposed over the real-time view of the target area captured by the mobile interface device.

* * * * *